(12) United States Patent
Pickler

(10) Patent No.: US 6,702,135 B2
(45) Date of Patent: Mar. 9, 2004

(54) UNIVERSAL DUMPSTER

(76) Inventor: Nathan L. Pickler, P.O. Box 528, Spencer, NC (US) 28159

( * ) Notice: Subject to any disclaimer, the term of this patent is extended or adjusted under 35 U.S.C. 154(b) by 45 days.

(21) Appl. No.: 09/968,187

(22) Filed: Oct. 1, 2001

(65) Prior Publication Data

US 2002/0008104 A1 Jan. 24, 2002

Related U.S. Application Data

(63) Continuation-in-part of application No. 09/428,169, filed on Oct. 27, 1999, now Pat. No. 6,296,132.

(51) Int. Cl.[7] .................. B65D 88/02; B65D 90/12; B65F 3/04; B65G 65/23
(52) U.S. Cl. .................. 220/1.5; 220/601; 220/629; 220/661; 220/826; 220/908; 220/908.3; 414/408; 414/410
(58) Field of Search .................. 220/1.5, 601, 661, 220/826, 830, 908, 908.3, 810, 811–813, 833, 848, 348, 4.26, 4.27; 232/43.1; 414/404–410

(56) References Cited

U.S. PATENT DOCUMENTS

| 2,885,101 | A | * | 5/1959 | Aldredge et al. | ........... 414/408 |
|---|---|---|---|---|---|
| 2,949,199 | A | * | 8/1960 | Jones | ........... 414/408 |
| 5,288,195 | A | * | 2/1994 | McIntyre | ........... 414/400 |
| 5,919,026 | A | * | 7/1999 | Appleton | ........... 414/408 |
| 5,951,230 | A | * | 9/1999 | Kruzick et al. | ........... 414/421 |
| 6,296,132 | B1 | * | 10/2001 | Pickler | ........... 220/1.5 |

* cited by examiner

Primary Examiner—Lee Young
Assistant Examiner—Niki M. Eloshway
(74) Attorney, Agent, or Firm—Christopher C. Dremann

(57) ABSTRACT

The invention is a universal dumpster adapted for use with both conventional front loading and roll-off refuse collection trucks. A universal dumpster according to this invention includes a floor, a pair of side walls, and a pair of end walls. The floor, side walls and end walls together define an interior compartment for collecting and containing solid waste. Sleeves rotatably mounted to the side walls engage the lifting arms of a front loading truck. At least one of the end walls includes a door that is movable between a first fully closed position and a second fully opened position for depositing solid waste into the dumpster and discharging the solid waste from the dumpster. The rotatable sleeves reduce the forces exerted on the lifting arms of the front loading truck. Accordingly, the capacity of the dumpster may be increased.

18 Claims, 15 Drawing Sheets

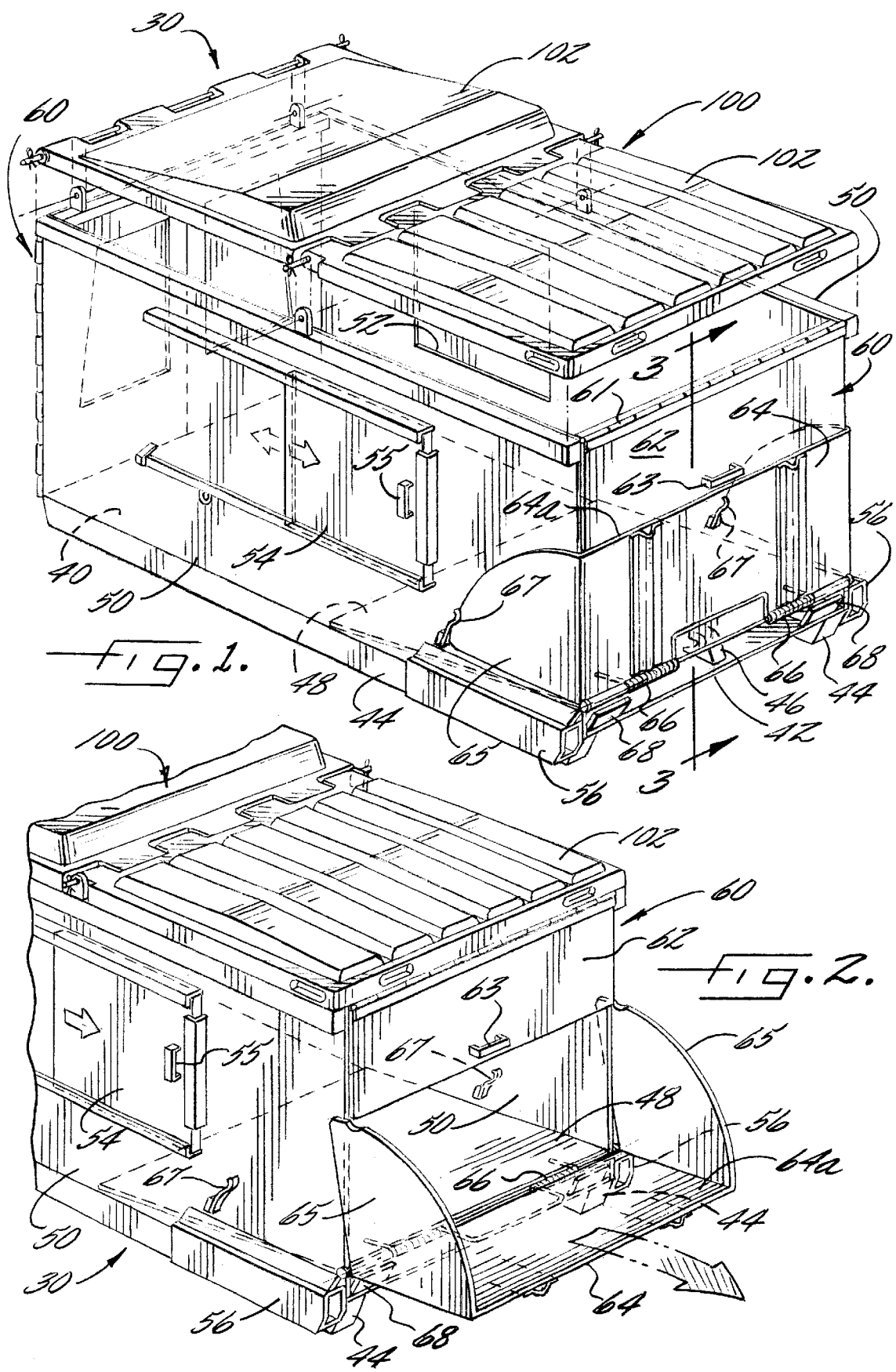

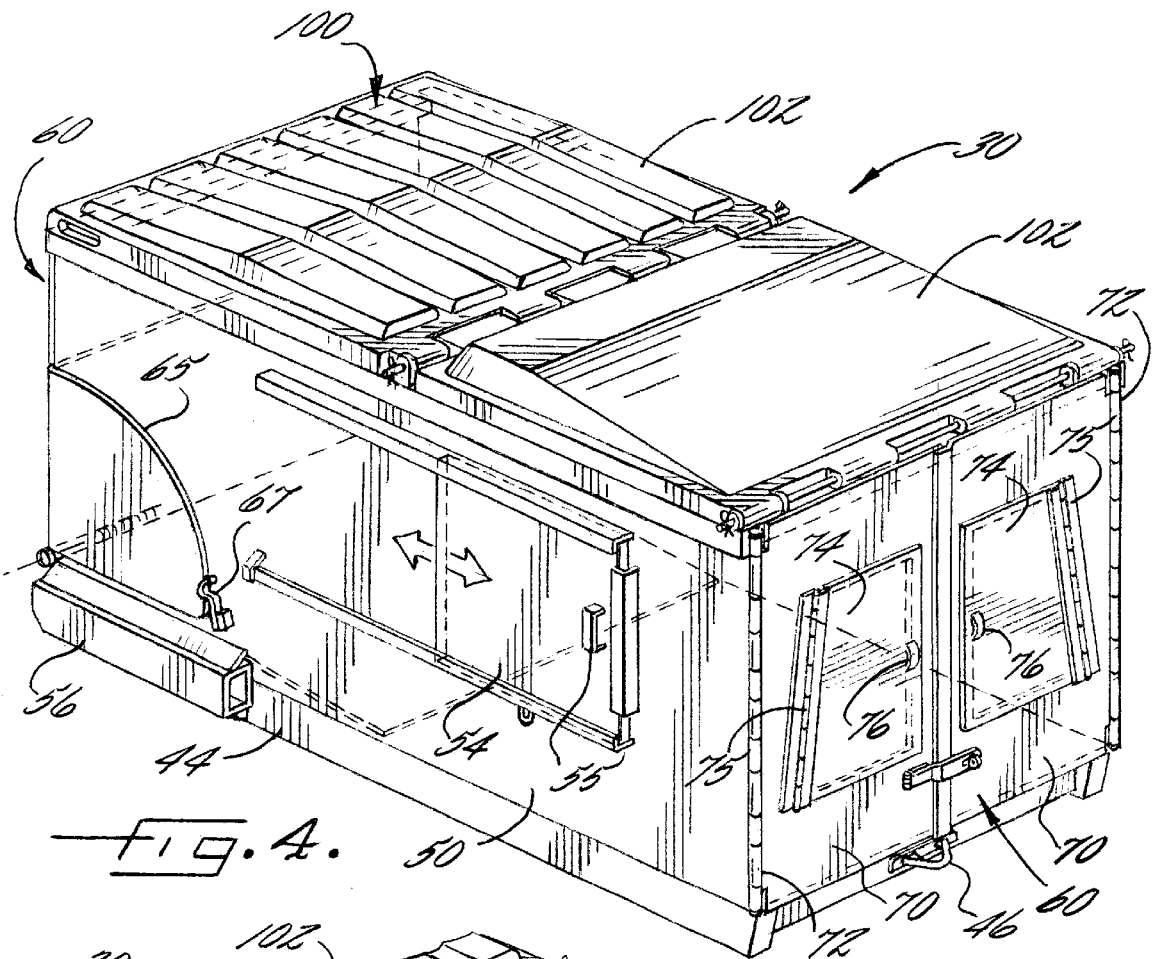

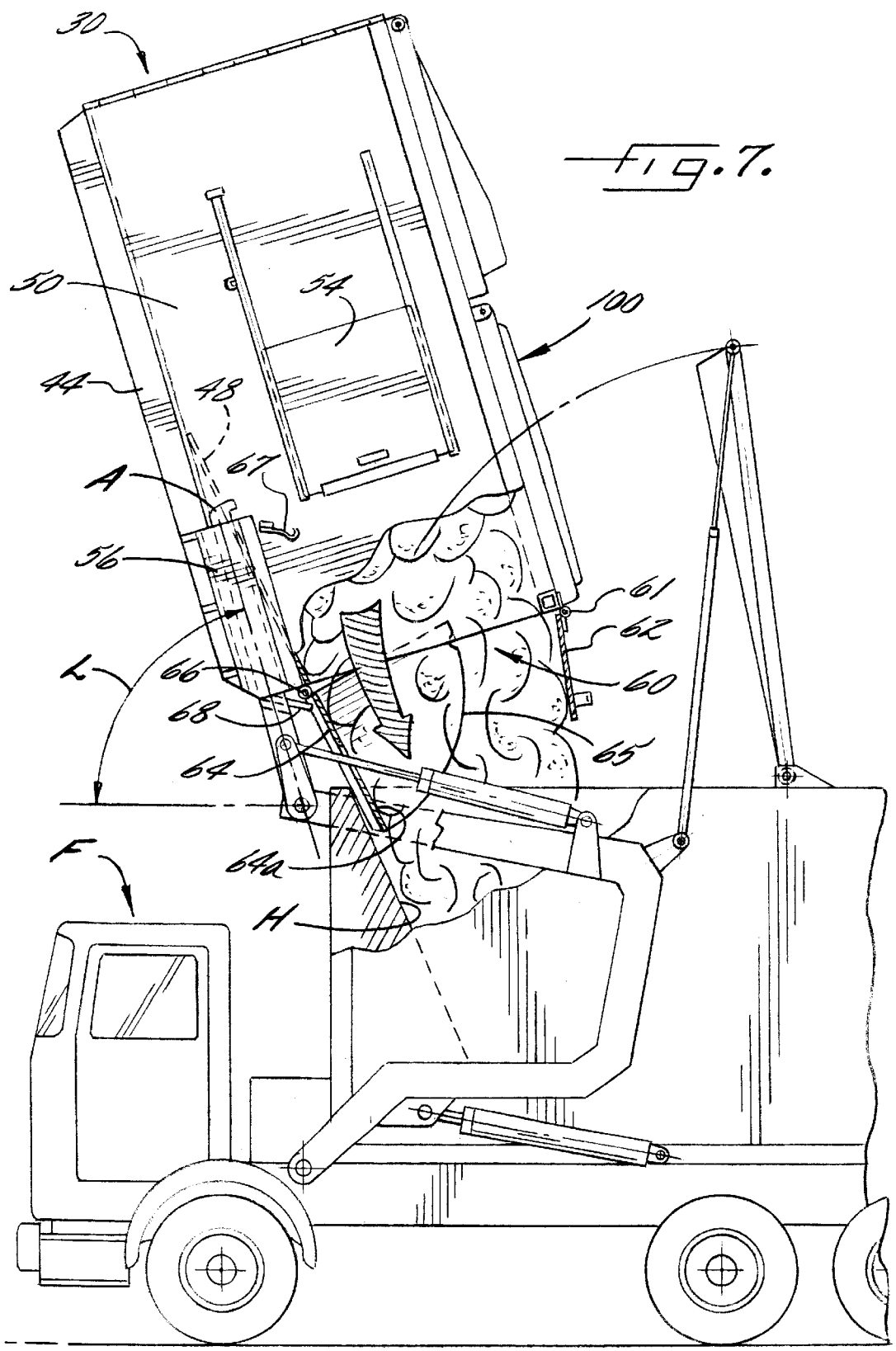

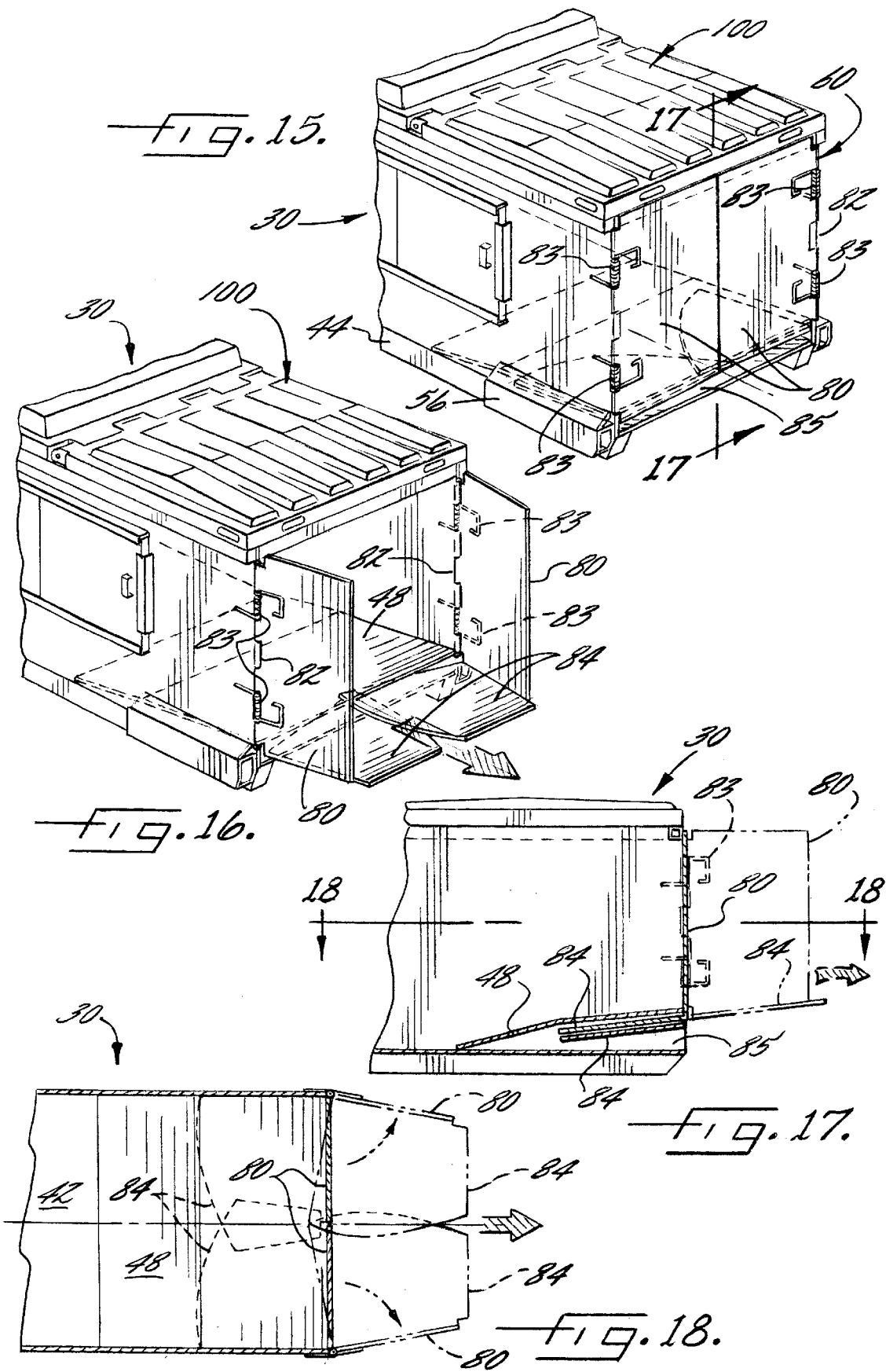

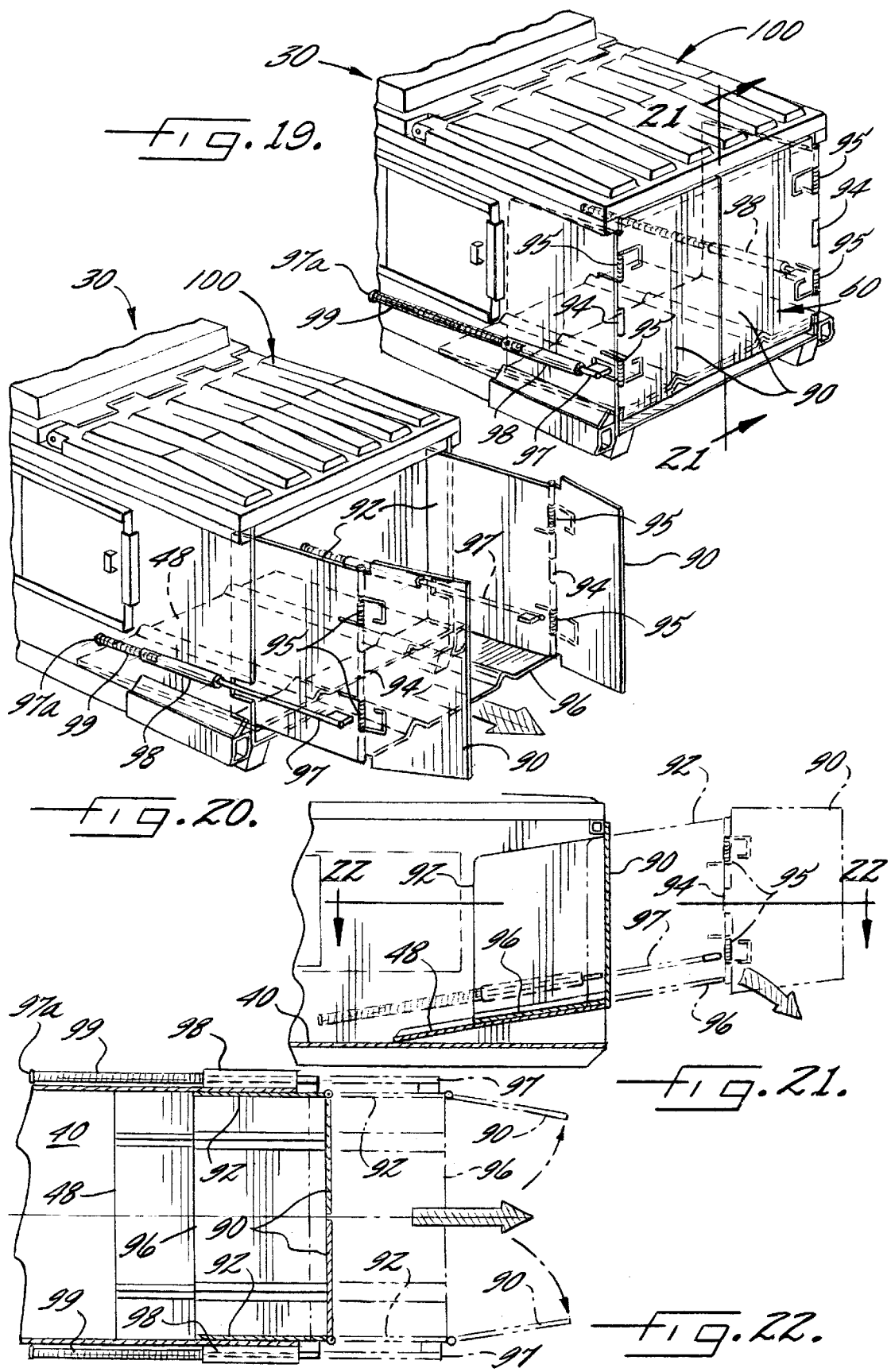

UNIVERSAL DUMPSTER

CROSS REFERENCE TO RELATED APPLICATION

This application is a continuation-in-part of application Ser. No. 09/428,169 filed Oct. 27, 1999, now U.S. Pat. No. 6,296,132.

FIELD OF THE INVENTION

The invention relates to a dumpster for collecting, containing and controlling solid waste at a refuse collection site. More particularly, the invention is a universal dumpster adapted for use with both a front loading and a roll-off refuse collection truck.

BACKGROUND OF THE INVENTION

Proper collection, containment, control, transportation and disposal of solid waste are necessary for protecting public health and safety and for promoting a clean environment. Containers, commonly known as dumpsters, that hold large quantities of solid waste generated at multifamily residential, institutional, commercial, industrial, and construction sites, are an important tool in the management of solid waste.

There are at least two types of dumpsters for handling solid waste, the "front loader" dumpster and the "rear loader" dumpster. Present dumpster designs incorporate several common features including: a floor, side walls, and end walls which together define an interior compartment; openings through which solid waste is placed into the interior compartment; openings through which the solid waste is discharged out of the interior compartment; and means for supporting the dumpster while the solid waste is being discharged.

The front loader type dumpster is typically used at multifamily residential and light commercial sites and is provided with sleeves fixed to the exterior of the side walls to receive the lifting arms of a front loading truck. The front loading truck approaches the front loader dumpster and positions the arms of the truck within the sleeves of the container. The driver then activates a hydraulic system which lifts the dumpster over the cabin of the truck and rotates it to a substantially inverted position to discharge the solid waste into a larger container on the back of the truck, generally referred to as a hopper. Next, the driver lowers the empty dumpster and withdraws the lifting arms of the front loading truck from the sleeves. The driver may then activate a compactor in the hopper to compact the solid waste and thereby increase the amount of solid waste that the hopper can accommodate. The front loading truck then travels to the location of the next front loader dumpster to repeat the procedure until the hopper is full. Once the hopper is full, the front loading truck travels to a disposal site, such as a landfill, to dispose of the solid waste.

The rear loader type dumpster is larger than a front loader type dumpster and is typically used at heavy commercial, industrial and construction sites. Rather than being emptied into the hopper of a front loading truck, the rear loader dumpster is pulled onto the bed of a roll-off truck and transported to the disposal site. A typical roll-off truck is equipped with a winch and roller system which positions the dumpster onto the bed of the truck for transportation to the disposal site. Once at the disposal site, the bed and dumpster are tilted so that the solid waste is discharged through one or more rear doors provided in the end wall of the dumpster, much like a dump truck. After being emptied, the rear loader dumpster is returned to the same or a different refuse collection site.

Utilizing different types of dumpsters which each require a different method of discharging the solid waste reduces both the cost effectiveness and the efficiency of solid waste collection. Conventional front loader type dumpsters are relatively small and are not provided with a door in an end wall of the dumpster. Furthermore, because the solid waste in a conventional front loader dumpster must be discharged through an opening in the top of the dumpster, it cannot be emptied by a roll-off truck. Conventional rear loader type dumpsters are wider than front loader type dumpsters and are not provided with sleeves. As such, a rear loader dumpster cannot be emptied by a front loading truck. Accordingly, solid waste collection would be more cost effective and efficient if the two types of dumpsters could be combined into a single universal dumpster which can be emptied by either a front loading truck or a roll-off truck.

A major environmental concern is the accidental dispersal of solid waste from a front loader dumpster while the solid waste is being discharged into the hopper of the front loading truck. For example, a sudden gust of wind may disperse some of the solid waste onto the ground surrounding the front loading truck as the front loader dumpster is being emptied. Front loader dumpsters are discharged at refuse collection sites that are typically located in areas where people live and work. Thus, the solid waste that is accidentally dispersed has a negative impact on both the public health and safety and the environment.

Conventional designs for front loader dumpsters pose additional safety concerns. The sleeves of a front loader dumpster that engage the lifting arms of a front loading truck are typically welded onto the exterior surface of the side walls of the dumpster. Because the solid waste in a conventional front loader dumpster is discharged through an opening in the top, the dumpster must be completely inverted to discharge all of the solid waste from the interior compartment. Completely inverting the dumpster induces shock stresses on the welds holding the sleeves to the side walls because the weight of the dumpster suddenly shifts from the top of the sleeves to the bottom of the sleeves as the dumpster is inverted. Over time, the welds holding the sleeves to the side walls can weaken and ultimately break from repeated emptying of the dumpster. As a result, the dumpster could fall onto the front loading truck as it is being inverted to discharge the solid waste, potentially injuring workers or passersby.

In addition to posing a safety hazard, the shock stresses induced on the sleeve welds reduce the efficiency of front loading trucks. The lifting capability of late model front-loading trucks usually exceeds the weight capacity of a front loader dumpster. However, because of the danger of the sleeves breaking away from the side walls, the usable volume of a front loader dumpster is limited by a safety factor. If front loader dumpsters were provided with doors in one of the end walls for discharging solid waste, they would not have to be completely inverted to discharge all of the solid waste from the interior compartment of the dumpster. Eliminating the need to completely invert the dumpster would eliminate the shock stresses on the welds holding the sleeves to the side walls induced by the sudden shifting of the weight of the dumpster on the sleeves. As a result, dumpsters capable of containing a larger volume of solid waste could be utilized with front loading trucks.

For the foregoing reasons, it is apparent that a need exists for a universal dumpster that can be emptied by either a front loading truck or a roll-off truck. A need also exists for a universal dumpster that minimizes, and preferably eliminates, the accidental dispersal of solid waste into the environment during discharge of the solid waste into the hopper of a front loading truck. Finally, there exists a need to increase both the safety of front loader dumpsters and the efficiency of front loading trucks.

SUMMARY OF THE OBJECTS OF THE INVENTION

Accordingly, it is a principal object of the present invention to provide a universal dumpster that is designed and constructed in such a way that it may be emptied by either a front loading truck or a roll-off truck.

It is a further object of the present invention to provide a universal dumpster that minimizes the environmental damage caused by the accidental dispersal of solid waste during discharge of the solid waste into the hopper of a front loading truck.

It is a further object of the present invention to provide a universal dumpster that is designed and constructed to be emptied by a front loading truck without inducing shock stresses on the welds which hold the sleeves to the side walls of the dumpster.

It is a further object of the present invention to provide a universal dumpster that is designed and constructed to be emptied by a front loading truck without exerting excessive forces on the lifting arms of a convention front loading refuse collection vehicle at the beginning of the lifting process.

It is a further object of the present invention to provide a universal dumpster that has an expandable volume.

It is a further object of the present invention to provide a universal dumpster having sufficient lids and doors conveniently located on the dumpster so that solid waste may be placed in all areas of the interior compartment of the dumpster.

SUMMARY OF THE INVENTION

The above objects and others are achieved by a universal dumpster constructed in accordance with the present invention. A universal dumpster according to this invention includes a floor having interior and exterior surfaces. A pair of side walls extend upwardly and generally perpendicularly from the floor. Likewise, a pair of end walls extend upwardly and generally perpendicularly from the floor. The end walls are also generally perpendicular to and attached to the side walls. The floor, side walls and end walls together define an interior compartment for collecting and containing solid waste. A sleeve is fixed to each side wall to engage the pickup arm of a conventional front loading refuse collection vehicle. At least one of the end walls of the dumpster includes at least one door which is movable between a first fully closed position and a second fully opened position which exposes an opening through the end wall for depositing solid waste into the dumpster and discharging the solid waste from the dumpster.

In one preferred embodiment of the invention, the end wall is formed by a downwardly opening lower door hingedly attached to the floor and having a front panel and a pair of side panels. The front panel and the side panels form a discharge chute when the lower door is in the second fully opened position. In another preferred embodiment, the end wall is formed by a pair of front doors that are movable between a first fully closed position and a second fully opened position. In the fully opened position, the doors form a discharge chute. Each door is hingedly attached to one of the side walls and has a floor panel extending from the base of the door. In another preferred embodiment, the end wall is formed by a pair of front doors that are hingedly attached to a telescoping discharge chute. The telescoping discharge chute is formed by a floor ramp extension panel and side wall extension panels extending upwardly and generally perpendicularly from the floor ramp extension panel. The telescoping discharge chute is attached to the dumpster by at least one telescoping rod.

In addition, the dumpster may be constructed with or without a lid. A lid for a dumpster according to this invention is formed by at least one door which is movable between a first fully closed position and a second fully opened position which allows access to the interior compartment of the dumpster for depositing solid waste. Likewise, at least one of the side walls of the dumpster may be provided with a door that allows access to the interior compartment of the dumpster for depositing solid waste. In yet another preferred embodiment, the dumpster may include at least two wheels attached to the floor of the dumpster and a removable trailer hitch. The wheels and the trailer hitch permit the dumpster to be moved to a location that is accessible to a conventional refuse collection vehicle. In yet another preferred embodiment, the dumpster may include a pair of movable sleeves for reducing the forces exerted on the lifting arms of a conventional front loading refuse collection vehicle at the beginning of the lifting process, thereby further increasing the capacity of the dumpster.

BRIEF DESCRIPTION OF THE DRAWINGS

In view of the aforementioned objects and others, which will more readily appear as the nature of the invention is better understood, the invention consists in the novel combination and arrangement of parts hereinafter more fully described, illustrated and claimed with reference being made to the accompanying drawings in which:

FIG. 1 is a perspective view of a preferred embodiment of a universal dumpster according to the invention as viewed from the front of the dumpster.

FIG. 2 is a partial perspective view of the universal dumpster of FIG. 1 with the discharge chute shown in the fully opened position.

FIG. 4 is a perspective view of the universal dumpster of FIG. 1 as viewed from the rear of the dumpster.

FIG. 5A is a partial perspective view of the universal dumpster of FIG. 4 with the small inset doors shown in the opened position.

FIG. 7 is an environmental view of the universal dumpster of FIG. 1 illustrating the dumpster being lifted and emptied through the front doors into the hopper of a conventional front loading truck.

FIG. 15 is a partial perspective view of another preferred embodiment of a universal dumpster according to the invention as viewed from the front of the dumpster.

FIG. 16 is a partial perspective view of the universal dumpster of FIG. 15 with the front doors shown in the opened position.

FIG. 17 is a partial sectional view of the universal dumpster of FIG. 15 taken in the direction indicated by the line 17—17 in FIG. 15.

FIG. 18 is a partial sectional view of the universal dumpster of FIG. 15 taken in the direction indicated by the line 18—18 in FIG. 17.

FIG. 19 is a partial perspective view of another preferred embodiment of a universal dumpster according to the invention as viewed from the front of the dumpster.

FIG. 20 is a partial perspective view of the universal dumpster of FIG. 19 with the front doors shown in the fully opened position and the telescoping floor and telescoping side wall extensions shown in the fully extended position.

FIG. 21 is a partial sectional view of the universal dumpster of FIG. 19 taken in the direction indicated by the line 21—21 in FIG. 19.

FIG. 22 is a partial sectional view of the universal dumpster of FIG. 19 taken in the direction indicated by the line 22—22 in FIG. 21.

DETAILED DESCRIPTION OF THE PREFERRED EMBODIMENTS

Figure 3A:
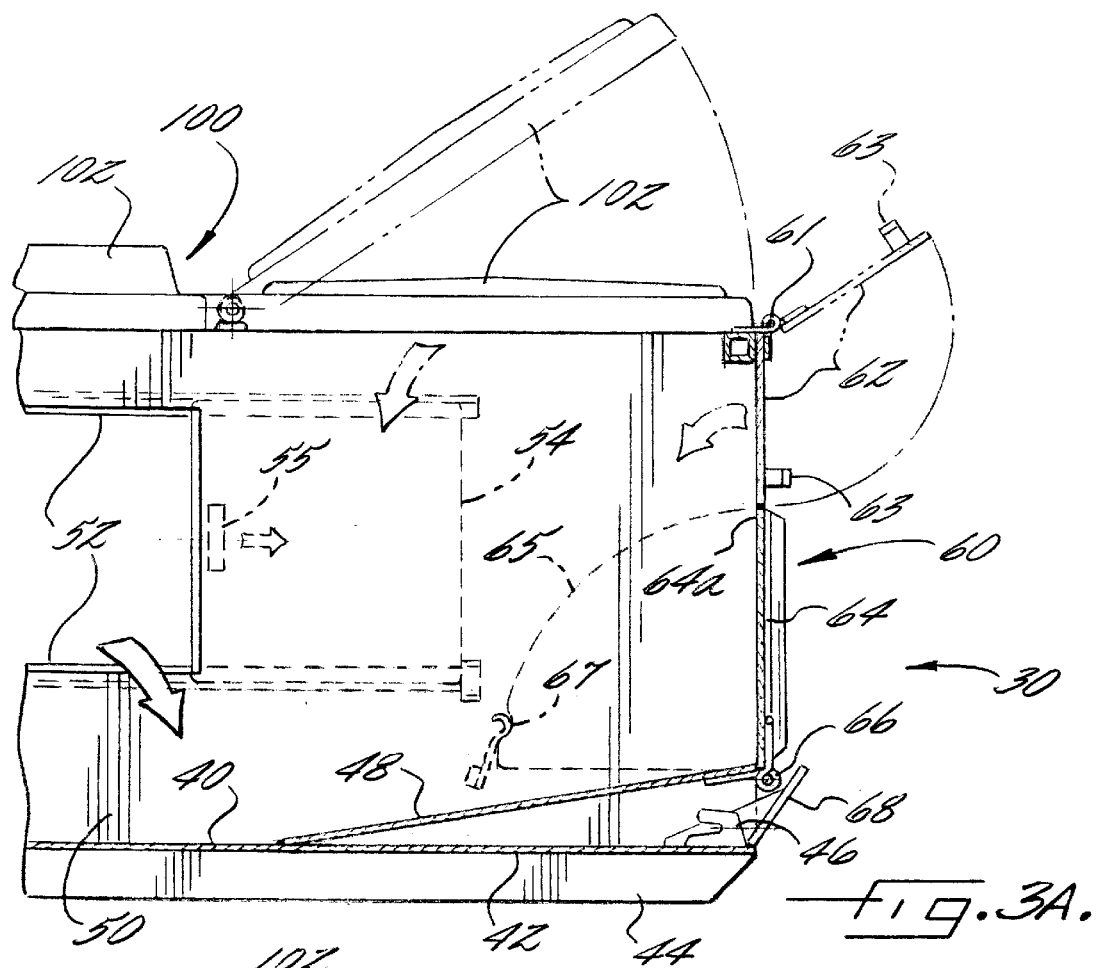
FIG. 3A is a partial sectional view of the universal dumpster of FIG. 1, taken in the direction indicated by the line 3—3 in FIG. 1, with phantom lines indicating the movement of the upper door in the end wall and one of the lid doors from their fully closed positions to their fully opened positions.

A number of preferred embodiments of the present invention will be described more fully hereinafter. However, the invention should not be construed as being limited to the embodiments described herein. Rather, it is intended that the invention be construed broadly to encompass any and all embodiments of a dumpster having the disclosed features, or equivalents thereof, which are within the skill of an ordinary person in the relevant art. In the description, like reference numerals designate like or corresponding parts throughout the several figures. It is to be also understood that such terms as "front", "rear", "top", "floor", "side", and "end" are used in the description for purposes of locating one element relative to another and are not to be construed as limiting terms. Finally, it should be understood that the illustrations provided in the figures are for the purpose of describing various preferred embodiments of the invention, and thus, are not intended to limit the scope of the invention in any manner.

Referring now to the accompanying figures, the invention is a large container, hereinafter referred to as a dumpster, indicated generally at 30, for the efficient collection, containment, and control of solid waste material. In the broadest sense, the dumpster 30 comprises a floor 40, opposed side walls 50, and opposed end walls 60. The floor 40, side walls 50 and end walls 60 together define an interior compartment of the dumpster 30 for collecting and containing the solid waste. Dumpster 30 is generally rectangular, but may be constructed to any size and shape which will contain the solid waste efficiently and accommodate the conventional apparatus for discharging the solid waste from the dumpster. While dumpsters are generally made of a rigid metal, such as steel, the dumpster 30 of the present invention may be made of any rigid and durable material. The floor 40, the side walls 50 and the end walls 60 are preferably thin and lightweight to permit conventional refuse collection vehicles to lift and transport as much solid waste as possible. However, the dumpster 30 must also be strong and durable enough to withstand repeated lifting, transportation and discharge of the solid waste, and prolonged exposure to the elements.

Figure 14:
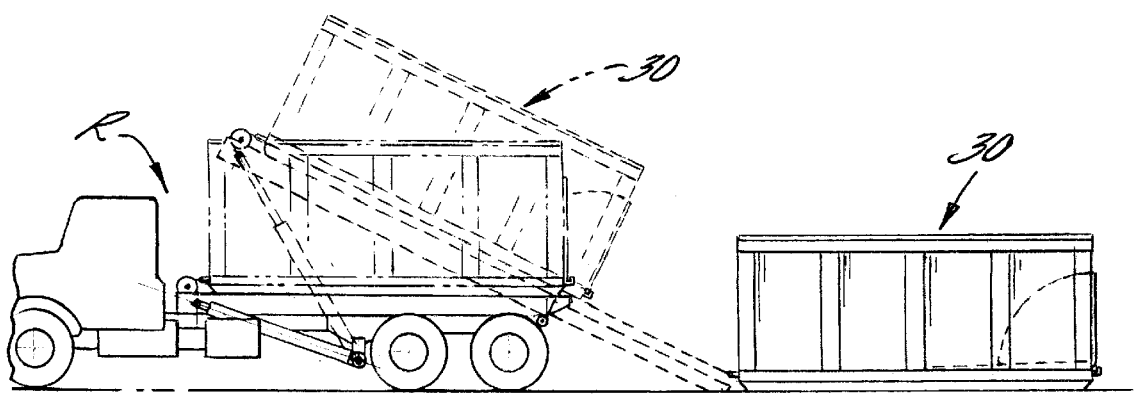
FIG. 14 is an environmental view of the universal dumpster of FIG. 12 illustrating the dumpster being pulled from the rear onto a conventional roll-off truck for transportation to a disposal site.

The floor 40 comprises floor plate 42 that is raised above the ground by support feet 44 attached to the underside of the floor plate 42. At least one hook 46 is also attached to the floor plate 42 adjacent to at least one of the end walls 60 for pulling the dumpster 30 onto a roll-off truck R, as illustrated in FIG. 14. The hook 46 is engaged by a conventional winch which pulls the dumpster 30 onto the bed of the roll-off truck R. As the dumpster 30 is pulled onto the bed of roll-off truck R, the support feet 44 engage rollers which assist the winch in positioning the dumpster 30 on the truck R and support the dumpster 30 during transportation. The support feet 44 and hook 46 may be attached to the floor plate 42 by any conventional means, such as welding, which provides a rigid and durable attachment. The floor 40 further comprises a ramp 48 that slopes upwardly from a medial point on the top side of the floor plate 42 in the direction of one of the end walls 60 to facilitate emptying of the solid waste, as will be described hereinafter.

Figure 9:
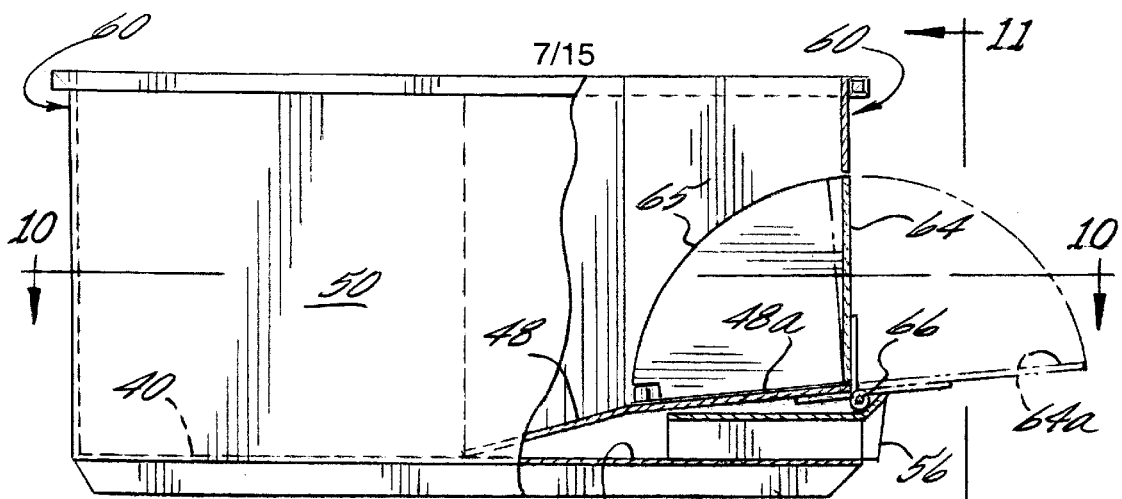
FIG. 9 is a partial elevation view and a partial sectional view of another preferred embodiment of a universal dumpster according to the invention.
Figure 10:
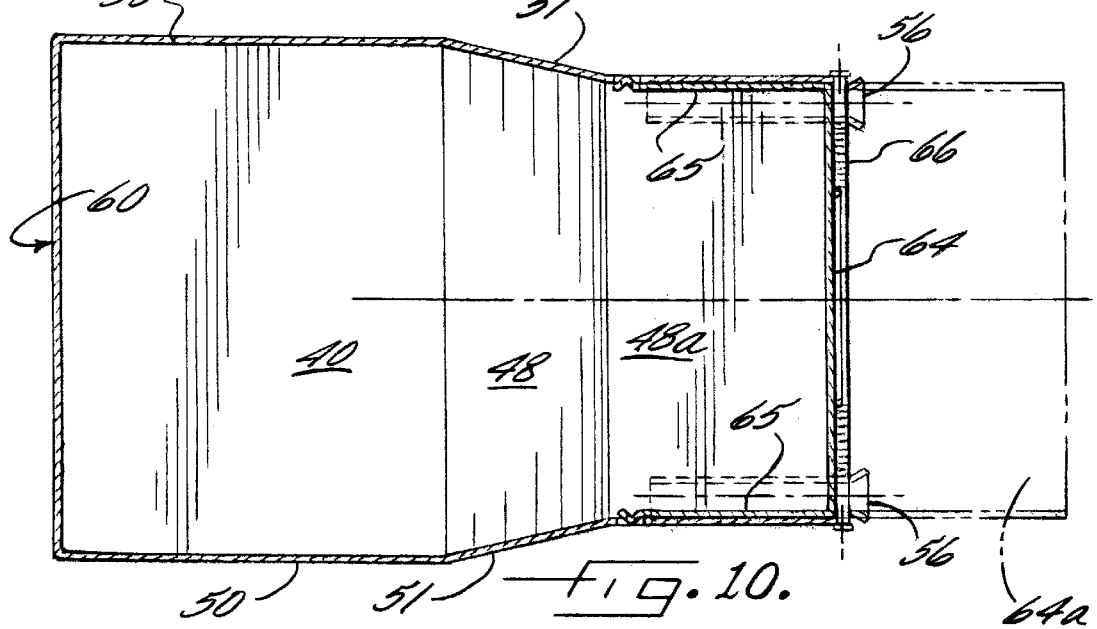
FIG. 10 is a sectional view of the universal dumpster of FIG. 9 taken in the direction indicated by the line 10—10 in FIG. 9.
Figure 11:
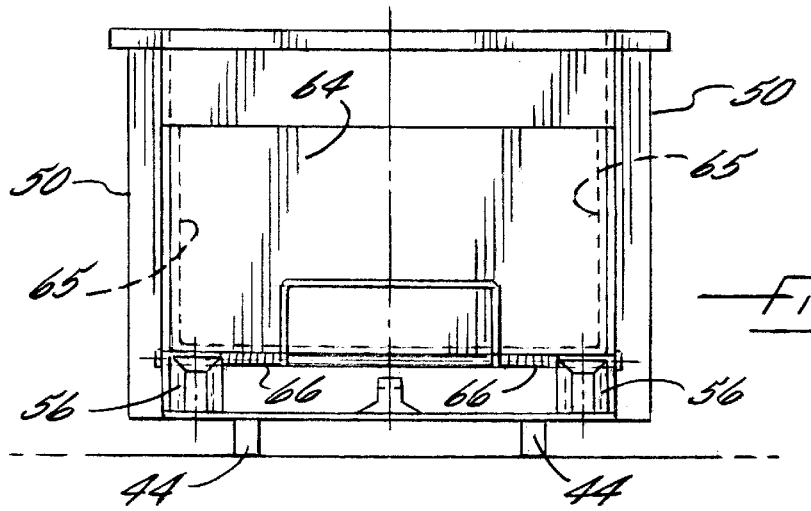
FIG. 11 is an end view of the universal dumpster of FIG. 9 taken in the direction indicated by the line 11—11 in FIG. 9.

The side walls 50 extend upwardly and generally perpendicularly from the floor 40. Preferably, at least one of the side walls 50 has an opening 52 formed therein (FIG. 3A) which provides access to the interior compartment of the dumpster 30 for depositing the solid waste. More preferably, a door 54 may be provided that is movable from a fully closed position covering the opening 52 to a fully opened position exposing the opening 52. The door 54 may be provided with a handle 55 to facilitate movement between the fully closed position and the fully opened position. The door 54 is preferably biased in the closed position since it is desirable to cover the opening 52 while the dumpster 30 is being transported or emptied. As is shown in FIGS. 9, 10 and 11, the side walls 50 may comprise angled side portions 51 which taper inwardly to form a neck having a width narrower than that of the remainder of the interior compartment of the dumpster 30. The neck allows a dumpster 30 having the width of a conventional rear loading dumpster to be emptied into the hopper of a conventional front loading truck F.

Figure 6:
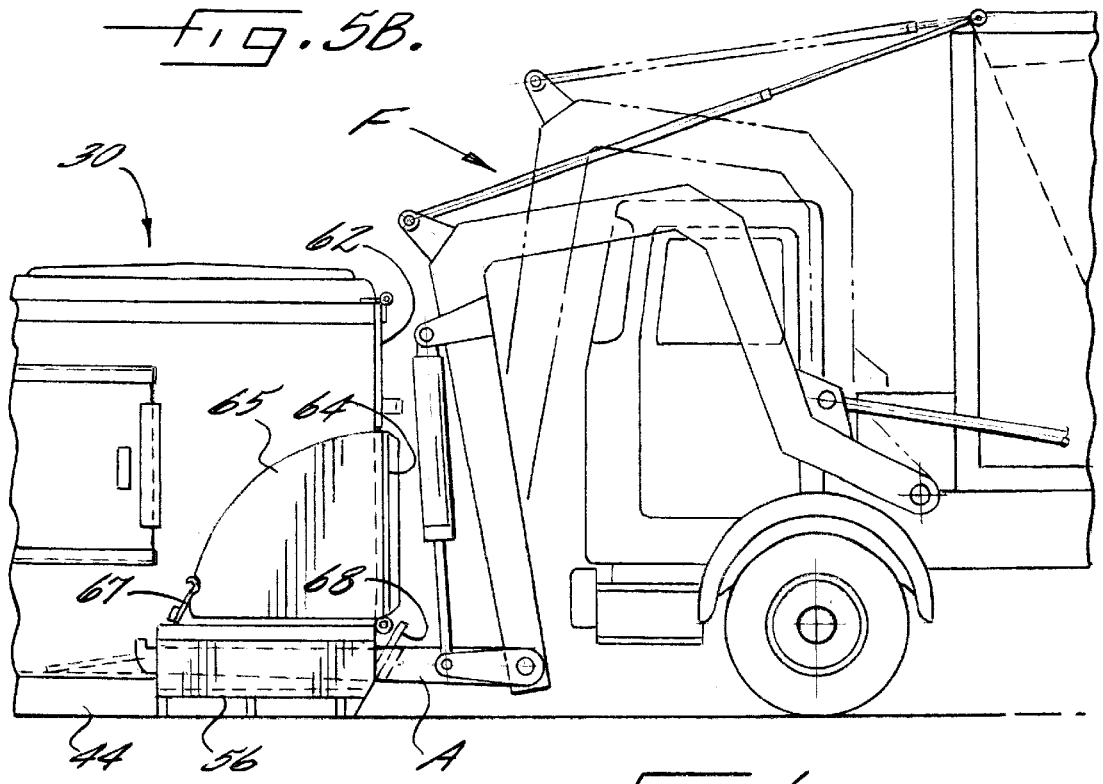
FIG. 6 is an environmental view of the universal dumpster of FIG. 1 illustrating the lifting arms of a conventional front loading truck engaging the sleeves of the dumpster.

A pickup sleeve 56 is fixed to each side wall 50. The sleeves 56 are constructed to accommodate the lifting arms A of a conventional front loading truck F (FIG. 6). In some preferred embodiments, the pickup sleeves 56 are positioned on the exterior surface of the side walls 50 adjacent the floor 40 of the dumpster 30 and flush with one of the end walls 60 of the dumpster 30 (FIG. 1–4, 6–8B, 15–16, 19–20). In other preferred embodiments, the sleeves 56 are positioned on the interior surface of the side walls 50 in the space between the floor ramp 48 and the floor plate 42 (FIGS. 9–11, 12–13, 23–24). The pickup sleeves 56 may be fixed to the side walls 50 by any conventional means, but preferably are welded to the exterior or interior surface of the side walls 50.

As best shown in FIGS. 1 and 2, in a preferred embodiment of the invention at least one of the end walls 60 is formed by an upwardly opening upper door 62 and downwardly opening lower door 64. Each of the doors, 62, 64 is movable between a fully closed and a fully opened position. The upwardly opening upper door 62 hangs between the ends of the side walls 50 from a lateral hinge 61. Handle 63 enables a user to open upper door 62 for the purpose of placing solid waste in the dumpster 30. Upper door 62 is biased in the closed position by gravity. However, hinge 61 may also be provided with a torsion spring (not shown) for biasing upper door 62 in the closed position. Downwardly opening lower door 64 comprises a front panel 64a and side panels 65 that overlap the exterior surface of side walls 50 when the lower door 64 is in the fully closed position. The lower door 64 is biased in the closed position by a pre-tensioned torsion spring 66 located along the hinge line formed between the lower door 64 and the floor 40 of the dumpster 30. Detent latches 67 may be attached to the exterior surface of the side walls 50 to insure that the lower door 64 remains in a closed position until the dumpster 30 is lifted and tilted by a front loading truck F to be emptied.

Figure 3B:
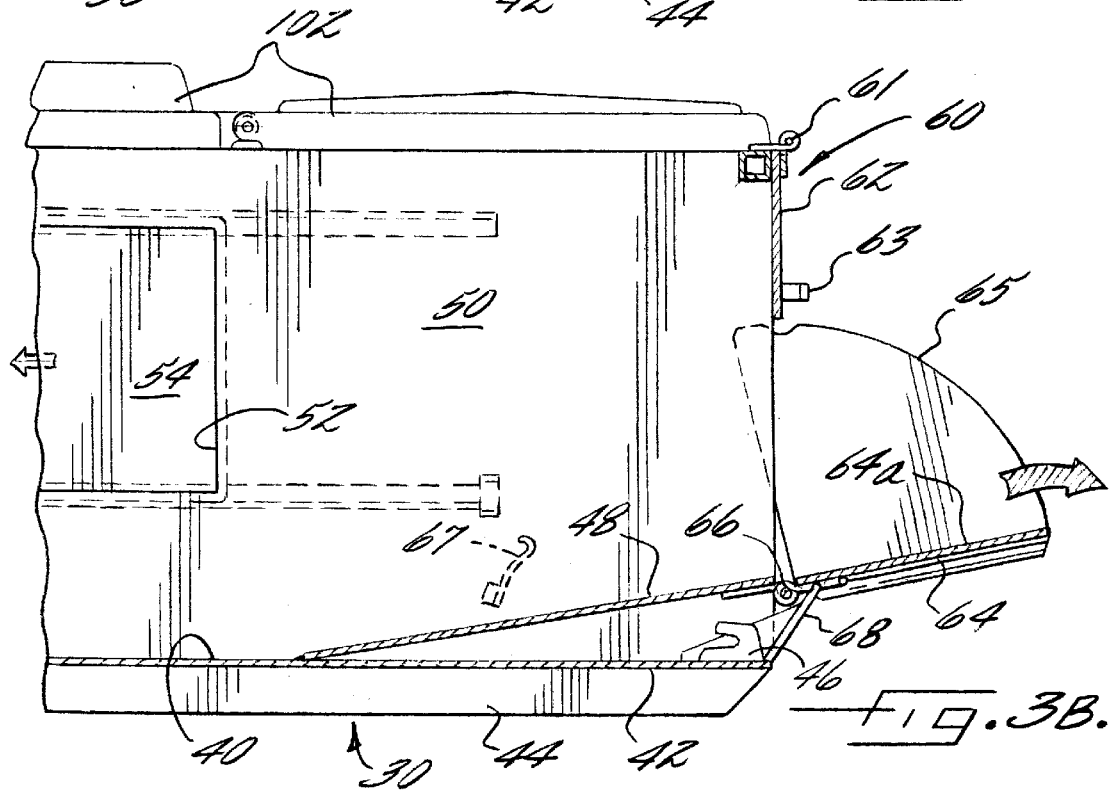
FIG. 3B is a partial sectional view of the dumpster of FIG. 2 taken in the direction indicated by the line 3—3 in FIG. 1.

When the dumpster 30 is tilted, the lower door 64 opens automatically under the weight of the solid waste in the interior compartment of the dumpster 30. A discharge chute, for directing the solid waste from the interior compartment of the dumpster 30 into the hopper H of the front loading truck F (FIG. 7), is formed by the front panel 64a and the side panels 65 of the fully opened lower door 64. The upper door 62 also opens when the dumpster 30 is lifted and tilted into position for emptying. Preferably, when the lower door 64 is in the fully opened position, the angle of the front panel 64a relative to the floor 40 of the dumpster 30 corresponds to the angle of the ramp 48 relative to the floor 40. Thus, the front panel 64a forms a straight line with the ramp 48, as shown in FIG. 3B. Preferably, at least one stop 68 is provided on the dumpster 30 to prevent the lower door 64 from opening beyond the point where the front panel 64a and the ramp 48 form a straight line. The stop 68 may be fixed to the floor 40 of the dumpster 30, as shown in FIG. 1, or may be fixed at any other convenient location on the dumpster 30.

Figure 5B:
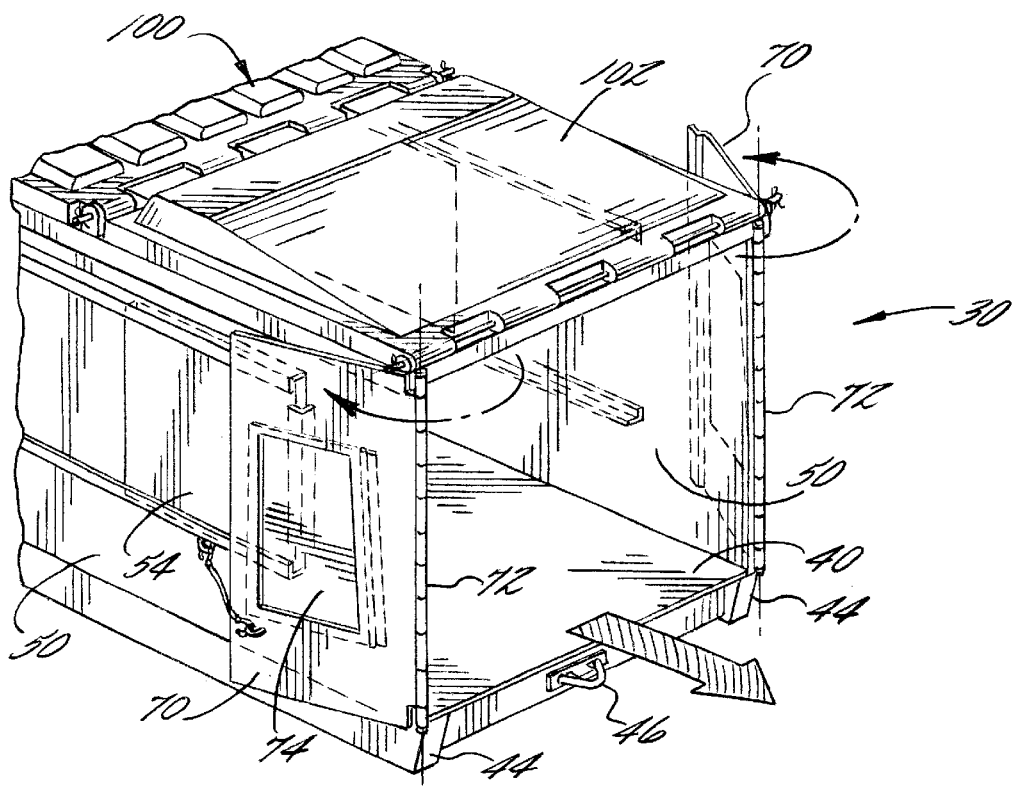
FIG. 5B is a partial perspective view of the universal dumpster of FIG. 4 with the large rear doors shown in the opened position.

A rear view of the same preferred embodiment of the invention is shown in FIGS. 4, 5A and 5B. In the rear view it is apparent that at least one of the end walls 60 is formed by a pair of large rear doors 70 attached to the side walls 50 by opposed vertical hinges 72. Preferably, each of the large rear doors 70 is biased in the closed position by a pre-tensioned spring located along the hinge line formed between the side wall 50 and the end wall 60.

Preferably, each of the rear doors 70 has an opening 73 formed therein (FIG. 5A) for providing access to the interior compartment of the dumpster 30 to deposit the solid waste. The opening 73 is covered by a small inset door 74 that is movable between a fully closed position and a fully opened position. Preferably, hinges 75 provided between the rear doors 70 and the inset doors 74 are angled relative to vertical to bias the inset doors 74 in the closed position. A handle 76 may also be provided to assist in opening the inset door 74.

Figure 8A:
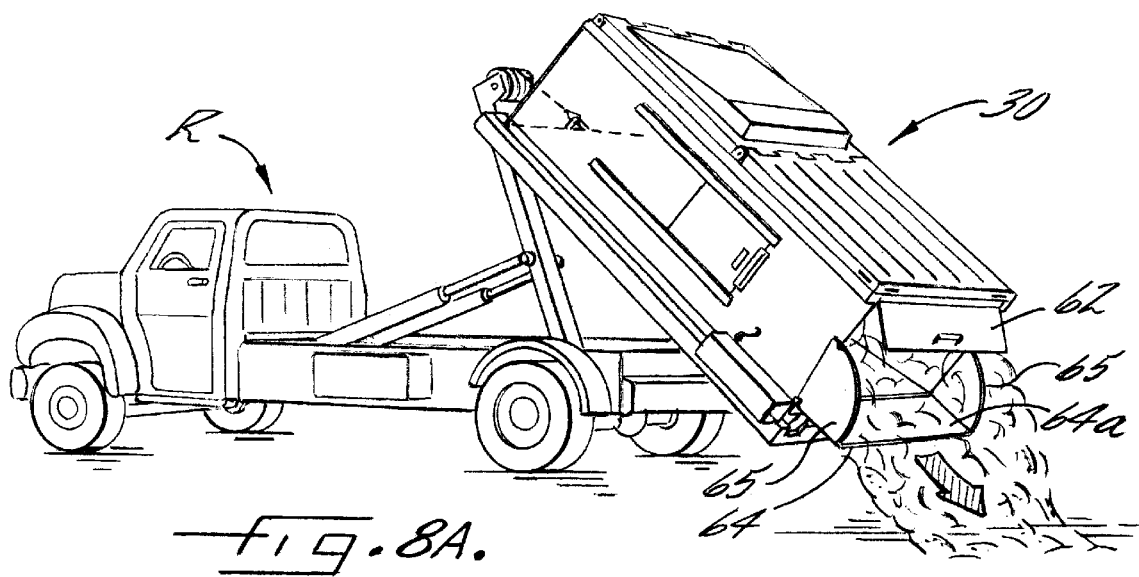
FIG. 8A is an environmental view of the universal dumpster of FIG. 1 illustrating the dumpster being tilted and emptied through the front doors by a conventional roll-off truck.
Figure 8B:
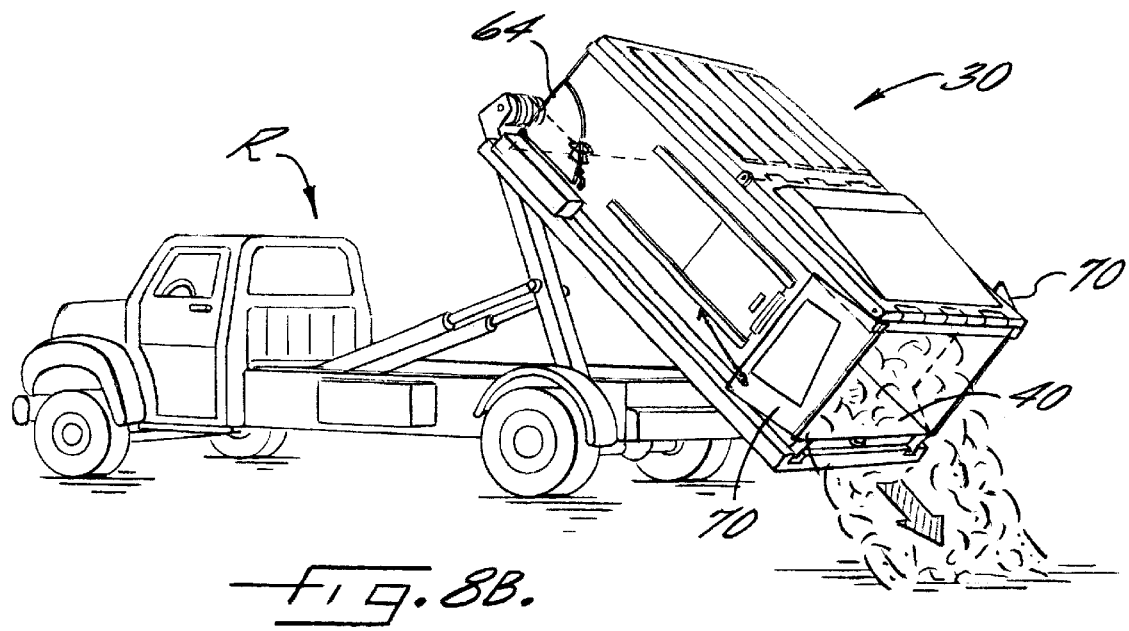
FIG. 8B is an environmental view of the universal dumpster of FIG. 1 illustrating the dumpster being tilted and emptied through the rear doors by a conventional roll-off truck.

The preferred embodiment of the universal dumpster 30 described above has at least three advantages. First, the open upper door 62 and the open lower door 64 define a funnel that directs the solid waste into the hopper H of the front loading truck F. The funnel prevents the solid waste from being accidentally dispersed into the surrounding environment as the dumpster 30 is being emptied into the hopper H of the front loading truck F, as illustrated in FIG. 7. Second, because the dumpster 30 is emptied through an end wall 60 instead of the top, the dumpster 30 empties with a reduced lifting angle L relative to horizontal. More specifically, the front loading truck F does not have to rotate the dumpster 30 to a substantially inverted position as is required with a conventional front loader dumpster. Accordingly, the lifting angle L generates little or no torque reversal. As a result, the dumpster 30 may be made considerably larger than a conventional front loader dumpster. Third, the universal dumpster 30 of this preferred embodiment may be emptied from either end by a conventional roll-off truck R, as illustrated in FIGS. 8A and 8B.

Another preferred embodiment of the invention is shown in FIGS. 9–11. As previously mentioned, angled side portions 51 of side walls 50 allow dumpster 30 having the width of a conventional rear loading dumpster to be emptied into the hopper H of a conventional front loading truck F. This preferred embodiment utilizes pick up sleeves 56 positioned on the interior surface of side walls 50 in the space between the ramp 48 and the floor plate 42. In order to accommodate the sleeves 56, the space between the ramp 48 and the floor plate 42 is enlarged by the addition of a ramp portion 48a. Ramp portion 48a is positioned at less of an angle relative to the floor 40 than that of ramp 48. Preferably, when the downwardly opening lower door 64 is in the fully opened position, the angle of the front panel 64a relative to the floor 40 corresponds to the angle of the ramp portion 48a relative to the floor 40. Side panels 65 of lower door 64 overlap the interior surface of side walls 50 of the dumpster 30.

Figure 12:
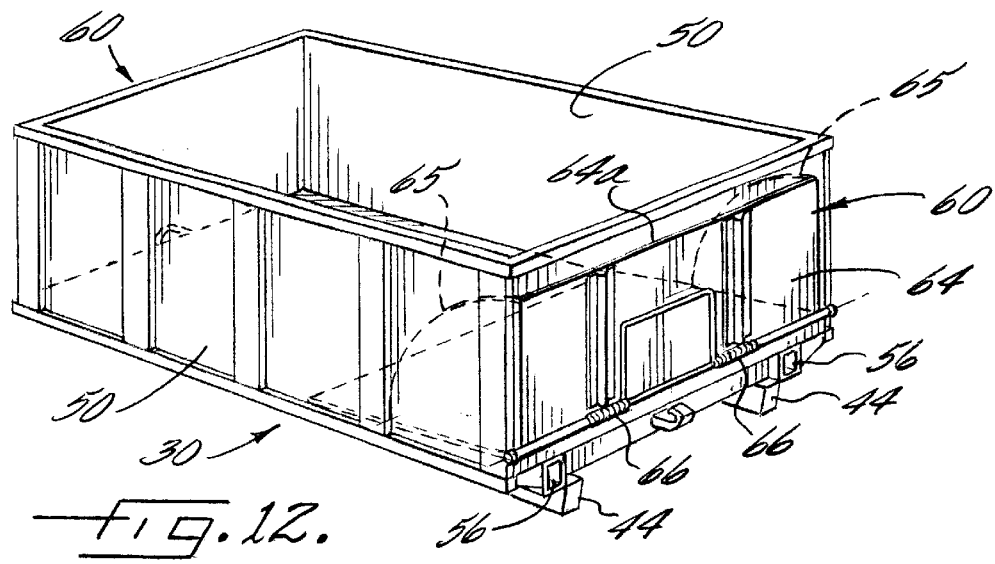
FIG. 12 is a perspective view of another preferred embodiment of a universal dumpster according to the invention as viewed from the front of the dumpster.
Figure 13:
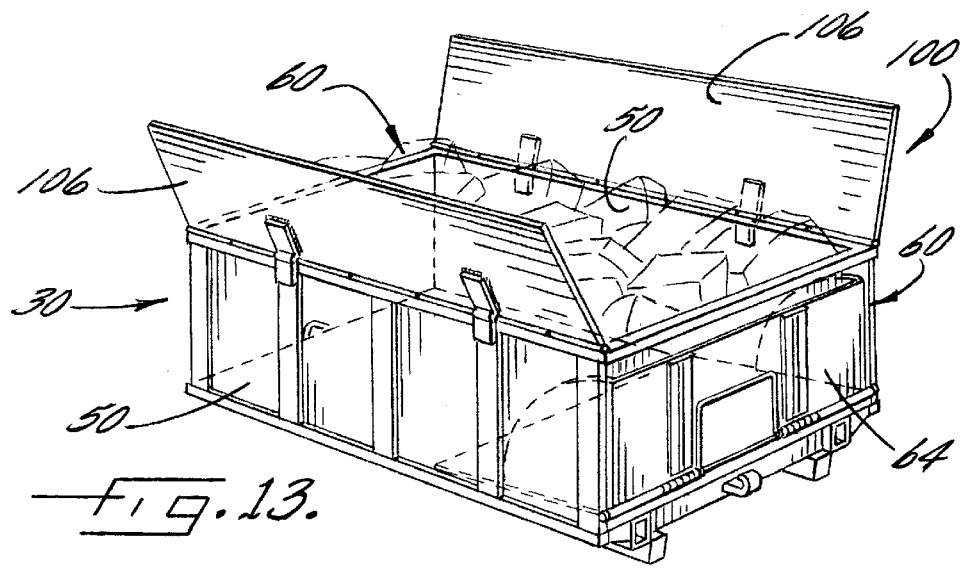
FIG. 13 is a perspective view of an alternate embodiment of the universal dumpster of FIG. 12.

Another preferred embodiment of the invention is shown in FIGS. 12 and 13. This preferred embodiment also utilizes a downwardly opening lower door 64 comprising side panels 65 that overlap the interior surface of side walls 50 of the dumpster 30.

Another preferred embodiment of the invention is shown in FIGS. 15–18. In this preferred embodiment, at least one of the end walls 60 of the dumpster 30 is formed by a pair of large front doors 80 attached to the side walls 50 by vertical hinges 82 such that the doors 80 are movable between a fully closed position and a fully opened position. Preferably, each door 80 is biased in the closed position by one or more pre-tensioned torsion springs 83 located along the hinge line formed between the side wall 50 and the end wall 60. Each door 80 comprises an arcuate floor panel 84 that is attached to the base of the door 80 at an angle relative to the floor 40 that corresponds to the angle of the ramp 48 relative to the floor 40 of the dumpster 30. When the doors 80 are in the fully opened position, the floor panels 84 overlap one another to form an extension of the ramp 48. In the closed position, the floor panels 84 retract into the open space 85 between the ramp 48 and the floor plate 42, as best shown in FIG. 17. In the fully opened position, the ramp 48, doors 80 and floor panels 84 define a funnel for discharging the solid waste from the interior compartment of the dumpster 30, as previously described.

Another preferred embodiment of the invention is shown in FIGS. 19–22. In this embodiment, at least one of the end walls 60 is formed by a pair of large front doors 90. The doors 90 are attached to side wall extension panels 92 by vertical hinges 94 such that the doors 90 are movable between a fully closed position and a fully opened position. Preferably, each door 90 is biased in the closed position by one or more pre-tensioned torsion springs 95 located along the hinge line formed between the side wall extension panel 92 and the door 90. Each side wall extension panel 92 is attached along its base to a floor ramp extension panel 96. The side wall extension panels 92 are connected to telescoping rods 97 which slide between a fully extended position and a fully retracted position to allow the side wall extension panels 92 and the floor ramp extension panel 96 to alternatively telescope outwardly from the dumpster 30 and retract back into the interior compartment of the dumpster 30. The telescoping rods 97 are mounted for movement in sleeves 98 that are fixed to the exterior surface of side walls 50 of the dumpster 30. Preferably, each of the telescoping rods 97 is biased in the fully retracted position by a coil spring 99. The end of the rod 97 is provided with a stop 97a to prevent the side wall extension panel 92 from extending too far. In the fully retracted position, the side wall extension panels 92 overlap the interior surface of the side walls 50 and floor ramp extension panel 96 overlaps the interior surface of the ramp 48 so that the dumpster 30 is available for receiving solid waste in the interior compartment. As the dumpster 30 is tilted for emptying, the side wall extension panels 92 and the floor ramp extension panel 96 slide outwardly from the dumpster 30 as a unit. Once the side wall extension panels 92 and the floor ramp extension panel 96 are fully extended, the doors 90 open outwardly under the weight of the solid waste being discharged from the dumpster 30. Together, the side wall extension panels 92, the floor ramp extension panel 96 and the doors 90 form a telescoping discharge chute for guiding the solid waste out of the interior compartment of the dumpster 30.

Preferably, dumpster 30 has a removable lid 100 which can be opened to allow access to the interior compartment of the dumpster 30 from above and can be closed to prevent refuse from blowing out of the dumpster 30 during transportation and during discharge of the solid waste from the interior compartment of the dumpster 30. One embodiment of the lid 100 comprises a pair of hinged top doors 102. The top doors 102 may be hinged at the end walls 60 or may be hinged at a medial location between the end walls 60 of the dumpster 30. Each top door 102 of the lid 100 opens upwardly to allow access to the interior compartment of the dumpster 30 to deposit the solid waste. One or both top doors 102 of the lid 100 may also be removed entirely to allow the dumpster 30 to be utilized, for example, at a construction site to collect and contain large articles of debris, such as building materials. The dumpster 30 may be constructed without any lid 100 as shown in FIG. 12. However, the lack of a lid 100 increases the likelihood that solid waste will be accidentally dispersed during discharge of the solid waste into the hopper H of a front loading truck F or during transportation by a roll-off truck R. In another preferred embodiment, shown in FIG. 13, the lid 100 of the dumpster 30 comprises a pair of top doors 106 hinged along the side walls 50 of the dumpster 30. This preferred embodiment allows use of the dumpster 30 at a construction site, or other site where large articles of solid waste are generated, without having to remove any portion of the lid 100.

Figure 23:
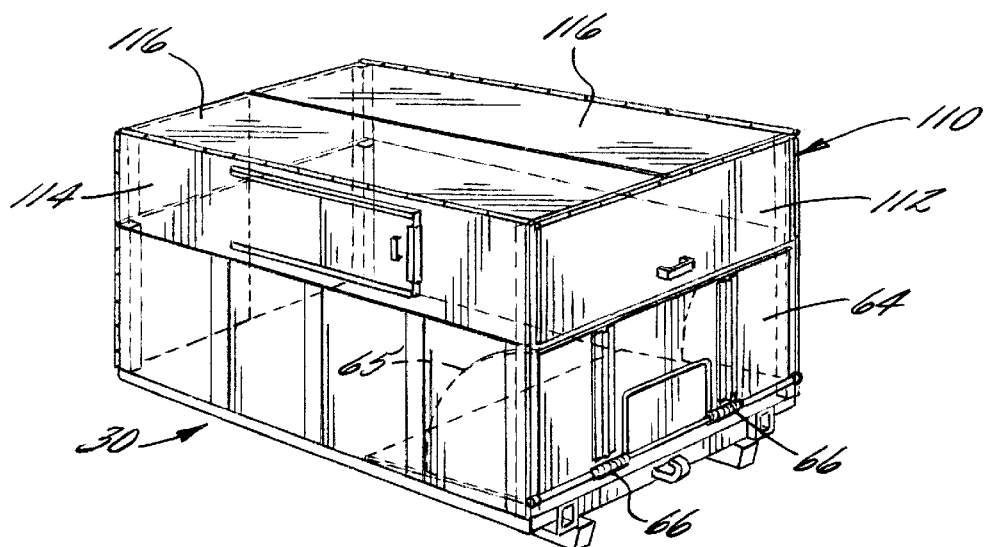
FIG. 23 is a perspective view of another preferred embodiment of a universal dumpster according to the invention as viewed from the front of the dumpster.
Figure 24:
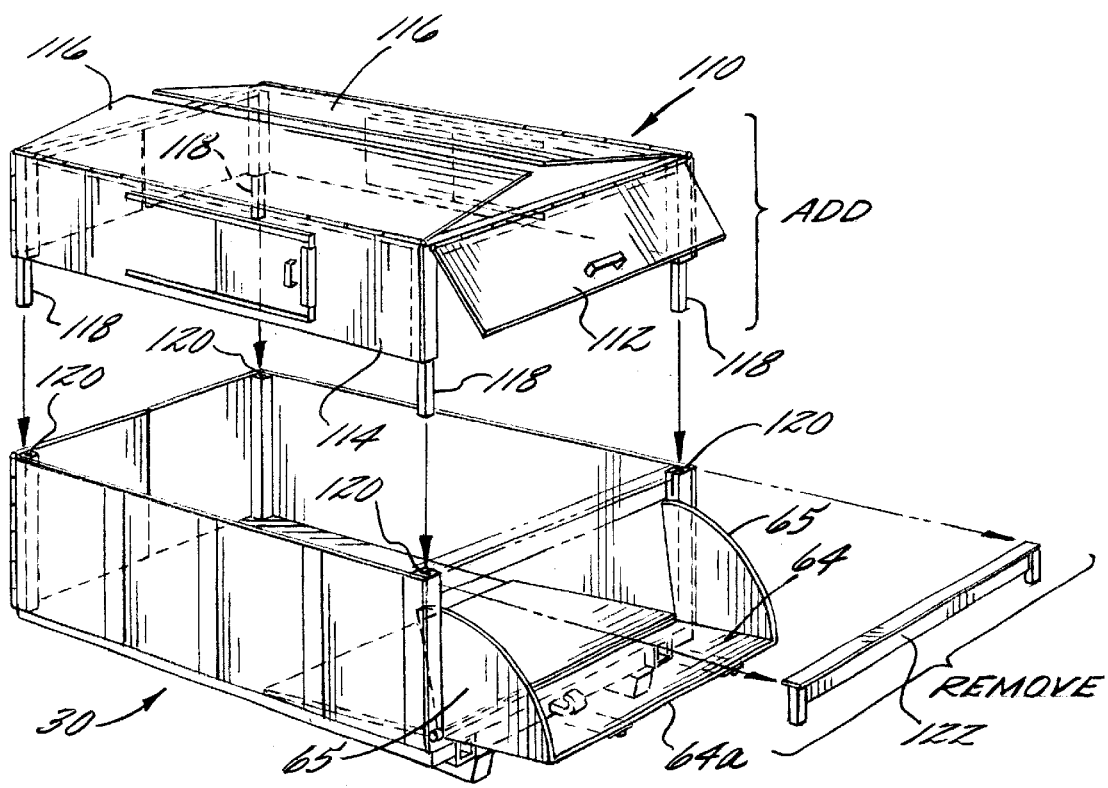
FIG. 24 is an exploded view of the universal dumpster of FIG. 23 with the discharge chute shown in the opened position.

In another preferred embodiment, shown in FIGS. 23 and 24, the dumpster 30 comprises a removable lid 110 for expanding the usable volume of the dumpster 30. The lid 110 comprises end walls 112, side walls 114 and a pair of top doors 116. A retaining leg 118 provided at each bottom corner of the lid 110 cooperates with a hollow corner post 120 provided at each upper corner of the dumpster to secure the lid 110 on the dumpster 30. A removable end wall cross bar 122 is also provided to support the end walls 60 of the dumpster 30 when the lid 110 is not in use. The cross bar 122 may be removed to prevent solid waste from catching between the hinged lower door 64 and the hinged end wall 112 during discharge when the lid 110 is in use. The end walls 112 and the side walls 114 of the lid 110 may be adapted for use with any of the preferred embodiments of the invention disclosed herein.

Figure 25:
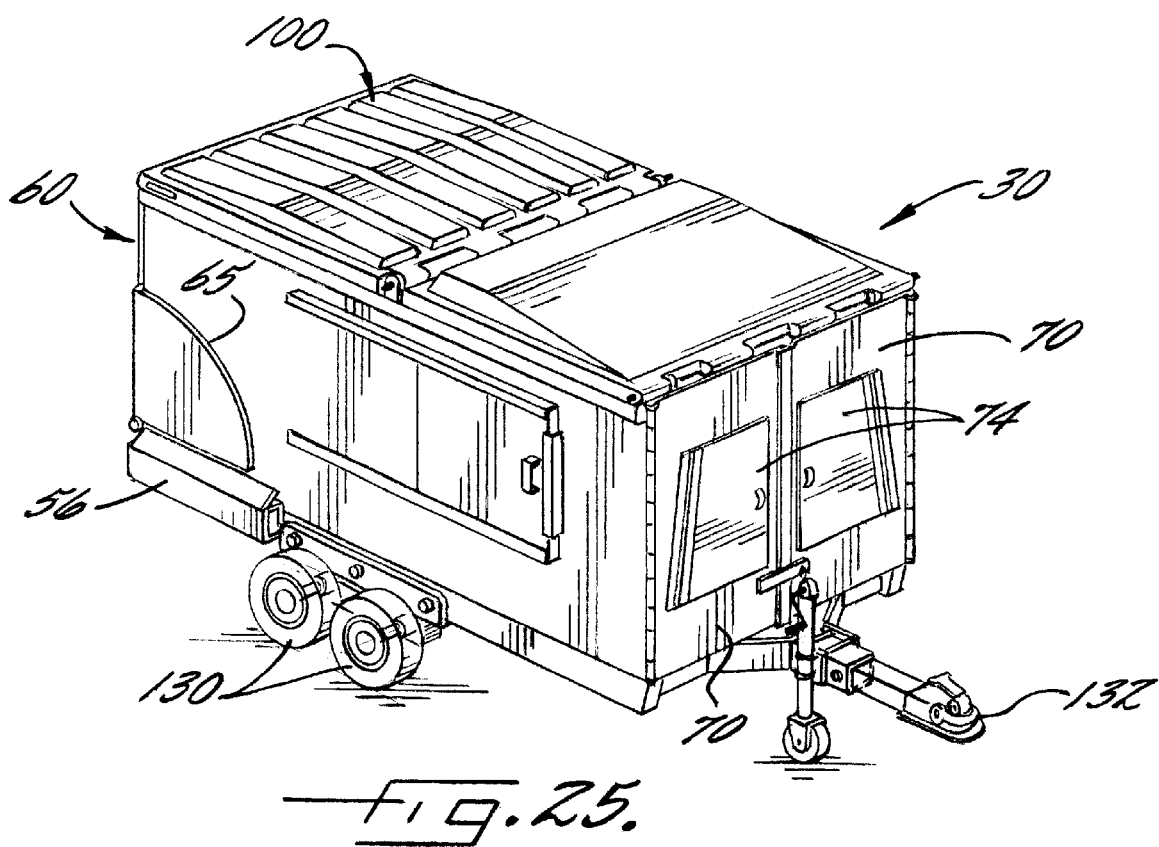
FIG. 25 is a perspective view of another preferred embodiment of a universal dumpster according to the invention.
Figure 26:
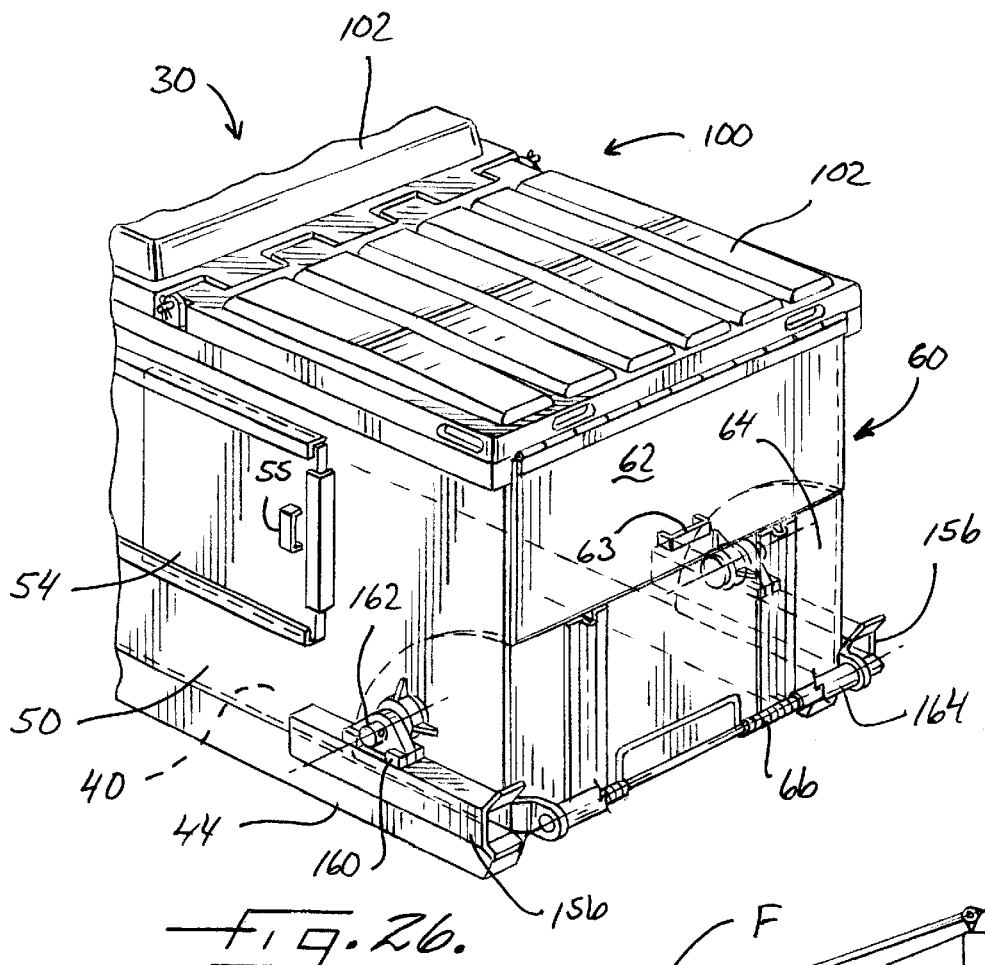
FIG. 26 is a perspective view of another preferred embodiment of a universal dumpster according to the invention as viewed from the front of the dumpster.

In some situations, it may be convenient to locate a dumpster 30 in a place that is not readily accessible to either a front loading truck F or a roll-off truck R. To accommodate these situations, the dumpster 30 could be fitted with wheels 130 and a removable trailer hitch 132 as shown in FIG. 25. The wheels 130 and removable trailer hitch 132 permit the dumpster 30 to be moved to a location that is accessible to the refuse collection trucks so that the dumpster 30 may be emptied.

Figure 29:
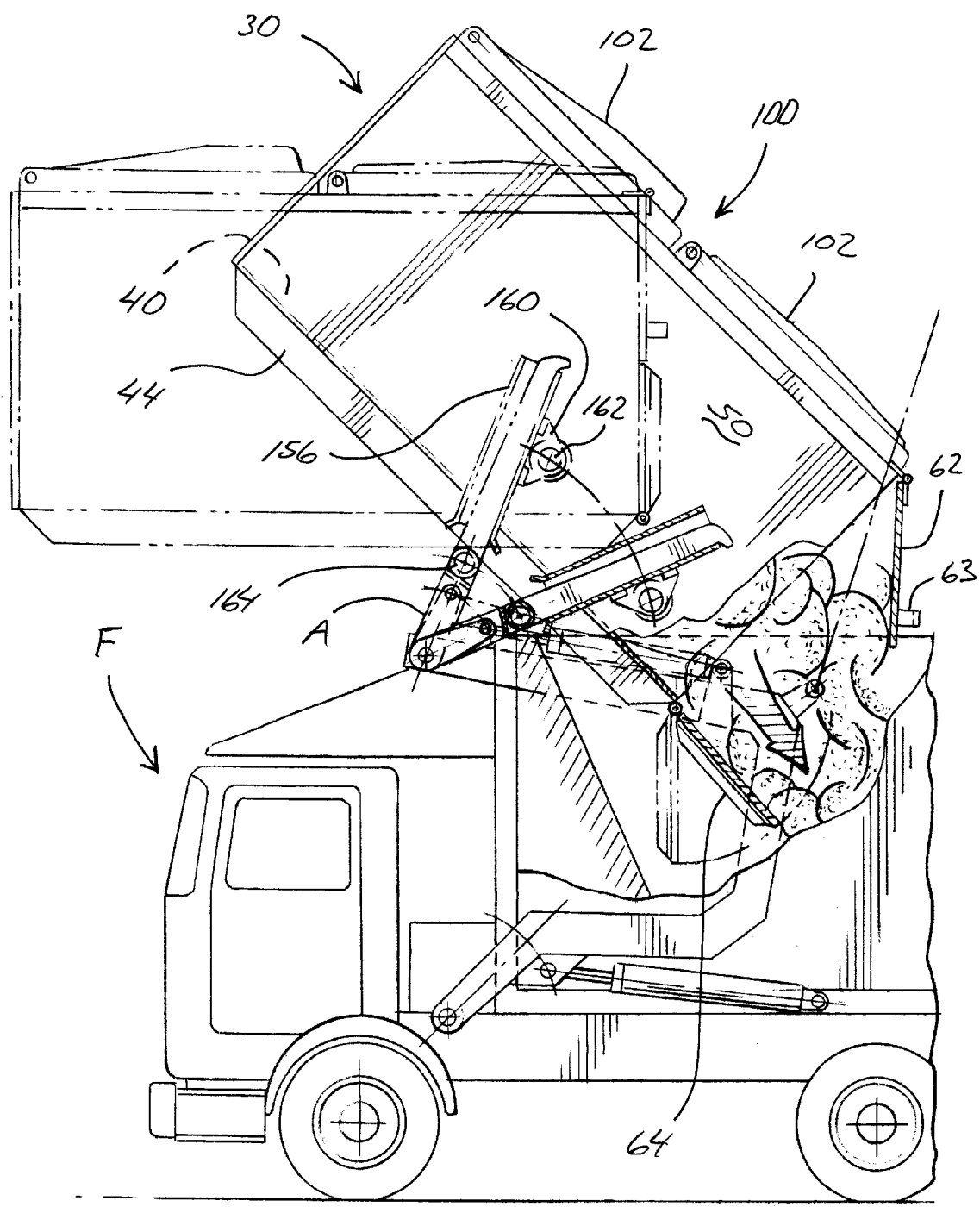
FIG. 29 is an environmental view of the universal dumpster of FIG. 26 illustrating the dumpster being emptied through the front doors into the hopper of a conventional front loading truck.

In yet another preferred embodiment, shown in FIGS. 26–29, the dumpster 30 reduces the forces exerted on the lifting arms A of a conventional front loading truck F. The dumpster 30 is substantially identical to the dumpster shown in FIGS. 1–8B except that the floor 40 does not comprise ramp 48 sloping upwardly from a medial point on the top side of the floor plate 42 in the direction of one of the end walls 60. As a result, the torsion spring 66 is located nearer to the ground. Accordingly, the front loading truck F is not required to rotate the dumpster 30 quite as far to discharge solid waste from the interior compartment of the dumpster 30 into the hopper H of the front loading truck F (FIG. 29). In addition, the pickup sleeves 156 are rotatably mounted to the exterior surface of the side walls 50 adjacent the floor 40 of the dumpster 30. The pickup sleeves 156 may be rotatably mounted to the side walls 50 in any known manner. As shown, each pickup sleeve 156 comprises a triangular-shaped pivot 160 mounted on a cylindrical trunnion pin 162 projecting outwardly from the side wall 50. Sleeves 156 are interconnected by a relatively large diameter sleeve bar 164 extending transversely between the side walls 50 such that sleeves 156 and sleeve bar 164 form a generally U-shaped lifting tongue.

Figure 27:
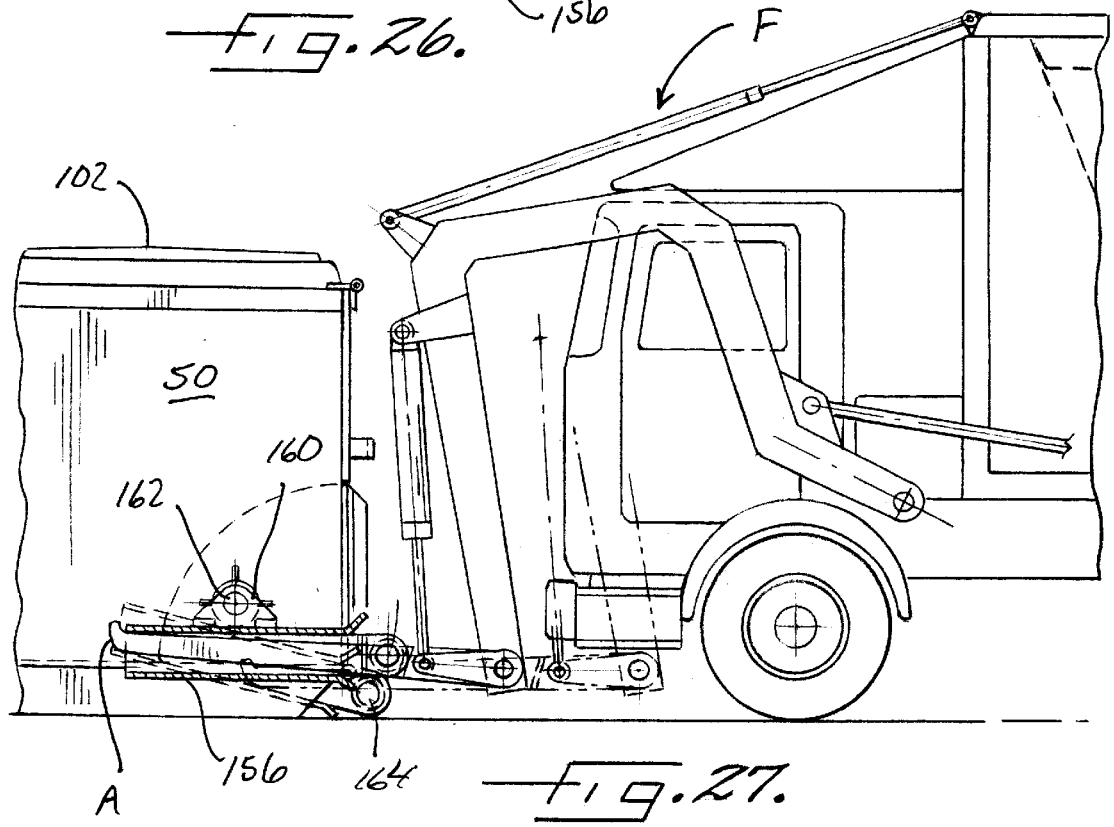
FIG. 27 is an environmental view of the universal dumpster of FIG. 26 illustrating the lifting arms of a conventional front loading truck engaging the sleeves of the dumpster.
Figure 28:
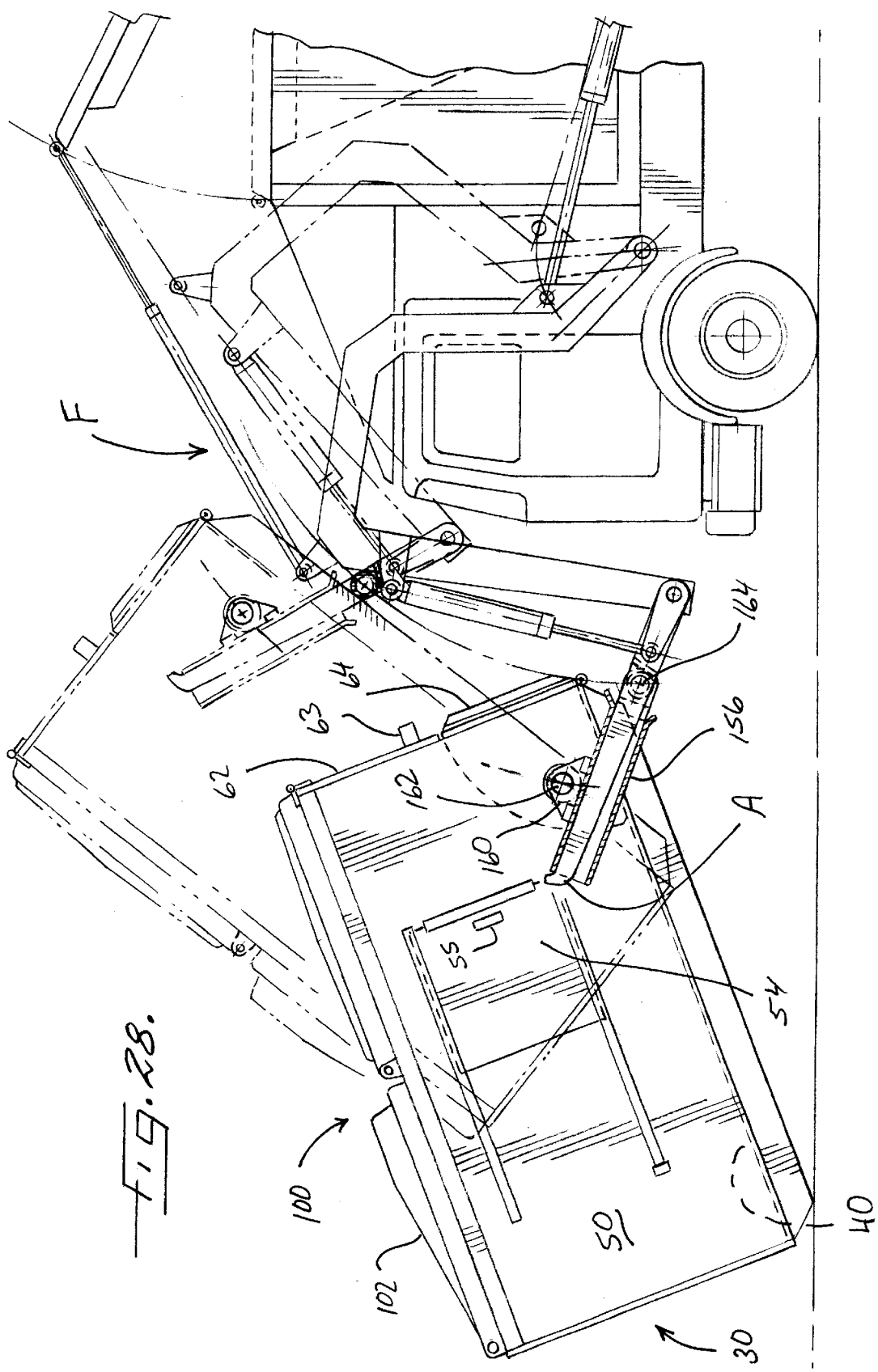
FIG. 28 is an environmental view of the universal dumpster of FIG. 26 illustrating the dumpster being lifted from the ground by the lifting arms of a conventional front loading truck.

As previously described, the sleeves 156 are constructed to engage the lifting arms A of a conventional front loading truck F (FIG. 27). However, because the sleeves 156 are rotatably mounted to the side walls 50, the sleeves 156 will be lying on the ground when the lifting arms A initially engage the sleeves 156 of the dumpster 30 (FIG. 27). As the lifting arms A fully engage the sleeves 156 and begin to lift the dumpster 30, the sleeves 156 rotate about the pivots 160 on the trunnions 162. As a result, the dumpster 30 is dragged in the direction of the front loading truck F until the sleeve bar 164 contacts feet 44 on the underside of the floor 40 of the dumpster 30. Rotation of the sleeves 156 is terminated once the dumpster 30 has been lifted by the front loading truck F approximately sixty degrees relative to horizontal, as depicted by the broken lines in FIG. 28. The front loading truck F continues to lift the dumpster 30 upwardly and rearwardly so that the dumpster 30 is substantially horizontal above the front loading truck F, as depicted by the broken lines in FIG. 29.

It should be noted that because the sleeves 156 are rotatably mounted to the side walls 50, the elevation of the dumpster 30 above the front loading truck F is reduced compared to the elevation of the dumpster 30, as depicted in FIG. 7. Accordingly, the center of gravity of the dumpster 30 is closer to the front loading truck F at both the beginning and during the initial stage of the lifting process, and less force is therefore exerted on the lifting arms A. As a result, the capacity of the dumpster 30 may be increased somewhat. The lifting arms A continue to lift and tilt the dumpster 30 rearwardly approximately 105 degrees until the weight of the solid waste in the interior compartment of the dumpster 30 automatically opens the lower door 64 against the torsion spring 66, as previously described. The lower dumping position, as depicted by the solid lines in FIG. 29, permits the solid waste in the interior compartment of the dumpster 30 to be discharged deeper into the hopper H of the front loading truck F.

It is to be understood that the forgoing description and specific embodiments shown herein are merely illustrative of the best mode of the invention and the principals thereof, and that various modifications and additions may be made by those skilled in the art without departing unnecessarily from the spirit and scope of the invention, which is intended to be limited only by the scope of the appended claims.

That which is claimed:

1. A dumpster for collecting and discharging solid waste comprising:
    a floor having interior and exterior surfaces;
    a pair of side walls having interior and exterior surfaces, each of said side walls extending upwardly from said floor and attached thereto;
    a pair of end walls having interior and exterior surfaces, each of said end walls extending upwardly from said floor and attached to said floor and said side walls;
    said floor, said side walls and said end walls defining an interior compartment for collecting the solid waste therein;
    a pair of sleeves, each of said sleeves rotatably mounted to the exterior surface of one of said side walls and having an elongate opening formed therein sized to accommodate the lifting arms of a front loading refuse collection vehicle, said sleeves being rotatably mounted to permit the lifting arms to lift and tilt the dumpster to discharge the solid waste from the interior compartment without inverting the dumpster; and
    a sleeve bar extending transversely between said side walls and interconnecting said sleeves such that said sleeves and said sleeve bar form a generally U-shaped lifting tongue.

2. A dumpster according to claim 1 wherein each of said sleeves comprises a pivot mounted on a trunnion pin secured to and projecting outwardly from one of said side walls.

3. A dumpster according to claim 1 wherein said floor further comprises a pair of elongate support feet, each of said support feet fixed to the exterior surface of said floor between said end walls and having a bottom surface for contacting said sleeve bar.

4. A dumpster according to claim 1 wherein at least one of said end walls has an opening therethrough and comprises a lower door hingedly attached to said floor, said lower door movable between a first fully closed position and a second fully opened position to discharge the solid waste from the interior compartment of the dumpster.

5. A dumpster according to claim 4 wherein said lower door moves to the second fully opened position automatically under the weight of the solid waste in the interior compartment defined by said floor, said side walls and said end walls when the dumpster is tilted to discharge the solid waste.

6. A dumpster according to claim 4 wherein said lower door is biased in the first fully closed position.

7. A dumpster according to claim 4 wherein said at least one end wall further comprises an upper door pivotally connected to said side walls.

8. A dumpster according to claim 1 wherein at least one of said side walls has at least one opening therethrough and comprises at least one movable door, said at least one door movable between a first fully closed position and a second fully opened position to provide access through the opening to the interior compartment defined by said floor, said side walls and said end walls.

9. A dumpster according to claim 1 wherein said floor further comprises at least one hook fixed to said floor adjacent one of said end walls for engaging a winch of a roll-off refuse collection vehicle.

10. A dumpster for collecting and discharging solid waste comprising:
    a floor having interior and exterior surfaces;
    a pair of side walls having interior and exterior surfaces, each of said side walls extending upwardly from said floor and attached thereto;
    a pair of end walls having interior and exterior surfaces, each of said end walls extending upwardly from said floor and attached to said floor and said side walls;
    said floor, said side walls and said end walls defining an interior compartment for collecting the solid waste therein;
    a pair of sleeves, each of said sleeves having an elongate opening formed therein sized to accommodate the lifting arms of a front loading refuse collection vehicle, said sleeves movable relative to said floor, said side walls and said end walls such that the dumpster is dragged in the direction of the front loading refuse collection vehicle when the lifting arms engage said sleeves and lift the dumpster, said sleeves being movable to permit the lifting arms to lift and tilt the dumpster to discharge the solid waste from the interior compartment without inverting the dumpster; and a sleeve bar extending transversely between said side walls and interconnecting said sleeves such that said sleeves and said sleeve bar form a generally U-shaped lifting tongue.

11. A dumpster according to claim 10 wherein each of said sleeves comprises a pivot mounted on a trunnion pin secured to and projecting outwardly from one of said side walls.

12. A dumpster according to claim 10 wherein said floor further comprises a pair of elongate support feet, each of said support feet fixed to the exterior surface of said floor between said end walls and having a bottom surface for contacting said sleeve bar.

13. A dumpster according to claim 10 wherein at least one of said end walls has an opening therethrough and comprises a lower door hingedly attached to said floor, said lower door movable between a first fully closed position and a second fully opened position to discharge the solid waste from the interior compartment of the dumpster.

14. A dumpster according to claim 13 wherein said lower door moves to the second fully opened position automatically under the weight of the solid waste in the interior compartment defined by said floor, said side walls and said end walls when the dumpster is tilted to discharge the solid waste.

15. A dumpster according to claim 13 wherein said lower door is biased in the first fully closed position.

16. A method for reducing the force exerted on the lifting arms of a front loading refuse collection vehicle when a dumpster is lifted to discharge solid waste, the method comprising the steps of:

providing a dumpster comprising:
a floor having interior and exterior surfaces;
a pair of side walls having interior and exterior surfaces, each of said side walls extending upwardly from said floor and attached thereto;
a pair of end walls having interior and exterior surfaces, each of said end walls extending upwardly from said floor and attached to said floor and said side walls;
said floor, said side walls and said end walls defining an interior compartment for collecting the solid waste therein;
a pair of sleeves, each of said sleeves having an elongate opening formed therein sized to accommodate the lifting arms of the front loading refuse collection vehicle, said sleeves movable relative to said floor, said side walls and said end walls;

engaging said sleeves of the dumpster with the lifting arms of the front loading refuse collection vehicle; and a sleeve bar extending transversely between said side walls and interconnecting said sleeves such that said sleeves and said sleeve bar form a generally U-shaped lifting tongue; and lifting and tilting the dumpster using the lifting arms of the front loading refuse collection vehicle to discharge the solid waste from the interior compartment without inverting the dumpster.

17. A method according to claim 16 wherein each of said sleeves comprises a pivot mounted on a trunnion pin secured to and projecting outwardly from one of said side walls.

18. A method according to claim 16 wherein said sleeve bar contacts the exterior surface of said floor medially between said end walls when the lifting arms of the front loading refuse collection vehicle lift the dumpster.

* * * * *